(12) United States Patent
Byrne et al.

(10) Patent No.: US 11,842,263 B2
(45) Date of Patent: Dec. 12, 2023

(54) CROSS-TEMPORAL PREDICTIVE DATA ANALYSIS

(71) Applicant: Optum Services (Ireland) Limited, Dublin (IE)

(72) Inventors: Neill Michael Byrne, Dublin (IE); Michael J. McCarthy, Castleknock (IE); Kieran O'Donoghue, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 588 days.

(21) Appl. No.: 16/898,861

(22) Filed: Jun. 11, 2020

(65) Prior Publication Data

US 2021/0390372 A1 Dec. 16, 2021

(51) Int. Cl.
  *G06N 3/04* (2023.01)
  *G06N 3/049* (2023.01)
  *G06N 5/04* (2023.01)
  *G06N 20/00* (2019.01)

(52) U.S. Cl.
  CPC .............. *G06N 3/049* (2013.01); *G06N 5/04* (2013.01); *G06N 20/00* (2019.01)

(58) Field of Classification Search
  CPC .... G06N 3/049; G06N 3/0454; G06N 3/0445; G06N 3/08; G06N 3/02; G06N 20/00; G06N 5/04; G06Q 20/00
  See application file for complete search history.

(56) References Cited

U.S. PATENT DOCUMENTS

| | | | |
|---|---|---|---|
| 2017/0316313 A1* | 11/2017 | Corrado | G06N 3/04 |
| 2019/0354836 A1* | 11/2019 | Shah | G06N 3/0445 |
| 2020/0210895 A1* | 7/2020 | Han | G06N 20/00 |
| 2020/0236402 A1* | 7/2020 | Spanias | G06N 3/08 |
| 2020/0257992 A1* | 8/2020 | Achin | G06N 20/10 |
| 2021/0287805 A1* | 9/2021 | Ko | G06N 3/0445 |
| 2021/0374517 A1* | 12/2021 | Enguehard | G06N 3/0481 |
| 2022/0044809 A1* | 2/2022 | Bihorac | G16H 50/20 |

FOREIGN PATENT DOCUMENTS

CN  105976056 A  9/2016

OTHER PUBLICATIONS

Peng, "Temporal Self-Attention Network for Medical Concept Embedding", Sep. 2019. (Year: 2019).*
Zeng, "Multilevel Self-Attention Model and its Use on Medical Risk Prediction", Pacific Symposium on Biocomputing, Jan. 2020. (Year: 2020).*

(Continued)

*Primary Examiner* — Dave Misir
(74) *Attorney, Agent, or Firm* — Alston & Bird LLP

(57) ABSTRACT

There is a need for more effective and efficient predictive data analysis. This need can be addressed by, for example, solutions for performing cross-temporal predictive data analysis. In one example, a method includes determining a time-adjusted encoding for each temporal unit of a group of temporal units, processing each time-adjusted encoding using a cross-temporal encoding machine learning model to generate a cross-temporal encoding of the group of temporal units, and performing one or more prediction-based actions based at least in part on the cross-temporal encoding.

20 Claims, 8 Drawing Sheets

(56) References Cited

OTHER PUBLICATIONS

Darabi, "TAPER: Time-Aware Patient EHR Representation", May 2020. (Year: 2020).*
Song, "Attend and Diagnose: Clinical Time Series Analysis Using Attention Models", The Thirty-Second AAAI Conference on Artificial Intelligence, 2018. (Year: 2018).*
Vinayavekhin, "Focusing on What is Relevant: Time-Series Learning and Understanding using Attention", 2018 24th International Conference on Pattern Recognition (ICPR) Beijing, China, Aug. 20-24, 2018. (Year: 2018).*
Saxena, "D-GAN: Deep Generative Adversarial Nets for Spatio-Temporal Prediction", 2019. (Year: 2019).*
Sajadmanesh, "NP-GLM: A Non-Parametric Method for Temporal Link Prediction", 2017. (Year: 2017).*
Wyc, "Encoding Cyclical Features for Deep Learning", Apr. 13, 2018. (Year: 2018).*
Choi, Edward et al. "Multi-Layer Representation Learning for Medical Concepts," arXiv Preprint arXiv:1602.05568v1, Feb. 17, 2016, pp. 1-20.
Devlin, Jacob et al. "Bert: Pre-Training of Deep Bidirectional Transformers for Language Understanding," arXiv Preprint arXiv:1810.04805, May 24, 2019, (16 pages).
Kumar, Yogesh et al. Predicting Utilization of Healthcare Services From Individual Disease Trajectories Using RNNs With Multi-Headed Attention, In Proceedings of Machine Learning Research, vol. 116, Apr. 30, 2020, pp. 93-111. PMLR.
Liu, Yang et al. "Hierarchical Transformers for Multi-Document Summarization," arXiv Preprint arXiv:1905.13164. May 30, 2019, (12 pages).
Ma, Fenlong et al. "Dipole: Diagnosis Prediction In Healthcare via Attention-Based Bidirectional Recurrent Neural Networks," arXiv preprint arXiv:1706.05764v1, Jun. 19, 2017, (10 pages).
Vaswani, Ashish et al. "Attention Is All You Need," 31st Conference on Neural Information Processing Systems, (2017), pp. 1-11.
Yang, Chengliang et al. "Machine Learning Approaches for Predicting High Cost High Need Patient Expenditures In Health Care," BioMedical Engineering Online, vol. 17, No. 131, (2018), pp. 81-100. DOI:10.1186/s12938-018-0568-3.

* cited by examiner

AGENT: DOE, JOHN

CLAIM ENTRIES

| GAP LIKELIHOOD | Claim Date | ID | REGION | Primary ICD Code | TOTAL |
|---|---|---|---|---|---|
| Very High | 2018-10-01 | 12345678 | SOUTHEAST | S06.0x1A | $20,000 |
| | 2018-08-19 | 23456789 | NORTHEAST | G44.311 | $18,450 |
| Very High | | 34567891 | CENTRAL | M54.2 | $18,400 |
| | | 45678912 | WEST | W20.8xxA | $18,200 |
| Very High | 2018-11-07 | 56789123 | SOUTHEAST | Y92.010 | $18,350 |
| High | 2018-10-11 | 12555678 | NORTHEAST | Y92.011 | $20,300 |
| | | 234777789 | NORTHEAST | S42.321A | $19,350 |
| Moderate | 2018-09-19 | 34537491 | WEST | M54.2895 | $18,600 |
| | | 45678412 | WEST | G44.311 | $13,250 |
| Low | 2018-12-07 | 56749223 | NORTHEAST | M54.2 | $13,370 |

Cervicalgia (Click to Read More)

FIG. 8

CROSS-TEMPORAL PREDICTIVE DATA ANALYSIS

BACKGROUND

Various embodiments of the present invention address technical challenges related to performing cross-temporal predictive data analysis. Various embodiments of the present invention address the shortcomings of existing prediction inference systems and disclose various techniques for efficiently and reliably performing cross-temporal predictive data analysis.

BRIEF SUMMARY

In general, embodiments of the present invention provide methods, apparatus, systems, computing devices, computing entities, and/or the like for performing cross-temporal predictive data analysis. Certain embodiments of the present invention utilize systems, methods, and computer program products that perform cross-temporal predictive data analysis by utilizing at least one of per-unit encodings of temporal unit data objects, time-adjusted encodings of temporal unit data objects, temporal positioning measures for temporal unit data objects, and cross-temporal encoding machine learning models that are configured to aggregate time-adjusted encodings of temporal unit data objects in order to generate cross-temporal encodings across temporal unit data objects.

In accordance with one aspect, a method is provided. In one embodiment, the method comprises: for each temporal unit data object of the plurality of temporal unit data objects: generating a per-unit encoding of the temporal unit data object based at least in part on one or more predictive input tokens associated with the temporal unit data object, and generating a time-adjusted encoding of the temporal unit data object based at least in part on the per-unit encoding of the temporal unit data object and a temporal positioning measure of the temporal unit data object within a temporal interval of the temporally-defined predictive input; processing each time-adjusted encoding for a temporal unit data object of the plurality of temporal unit data objects using a cross-temporal encoding machine learning model in order to generate a cross-temporal encoding of the temporal interval; and performing one or more prediction-based actions based at least in part on the cross-temporal encoding.

In accordance with another aspect, a computer program product is provided. The computer program product may comprise at least one computer-readable storage medium having computer-readable program code portions stored therein, the computer-readable program code portions comprising executable portions configured to: for each temporal unit data object of the plurality of temporal unit data objects: generate a per-unit encoding of the temporal unit data object based at least in part on one or more predictive input tokens associated with the temporal unit data object, and generate a time-adjusted encoding of the temporal unit data object based at least in part on the per-unit encoding of the temporal unit data object and a temporal positioning measure of the temporal unit data object within a temporal interval of the temporally-defined predictive input; process each time-adjusted encoding for a temporal unit data object of the plurality of temporal unit data objects using a cross-temporal encoding machine learning model in order to generate a cross-temporal encoding of the temporal interval; and perform one or more prediction-based actions based at least in part on the cross-temporal encoding.

In accordance with yet another aspect, an apparatus comprising at least one processor and at least one memory including computer program code is provided. In one embodiment, the at least one memory and the computer program code may be configured to, with the processor, cause the apparatus to: for each temporal unit data object of the plurality of temporal unit data objects: generate a per-unit encoding of the temporal unit data object based at least in part on one or more predictive input tokens associated with the temporal unit data object, and generate a time-adjusted encoding of the temporal unit data object based at least in part on the per-unit encoding of the temporal unit data object and a temporal positioning measure of the temporal unit data object within a temporal interval of the temporally-defined predictive input; process each time-adjusted encoding for a temporal unit data object of the plurality of temporal unit data objects using a cross-temporal encoding machine learning model in order to generate a cross-temporal encoding of the temporal interval; and perform one or more prediction-based actions based at least in part on the cross-temporal encoding.

BRIEF DESCRIPTION OF THE DRAWINGS

Figure 1:
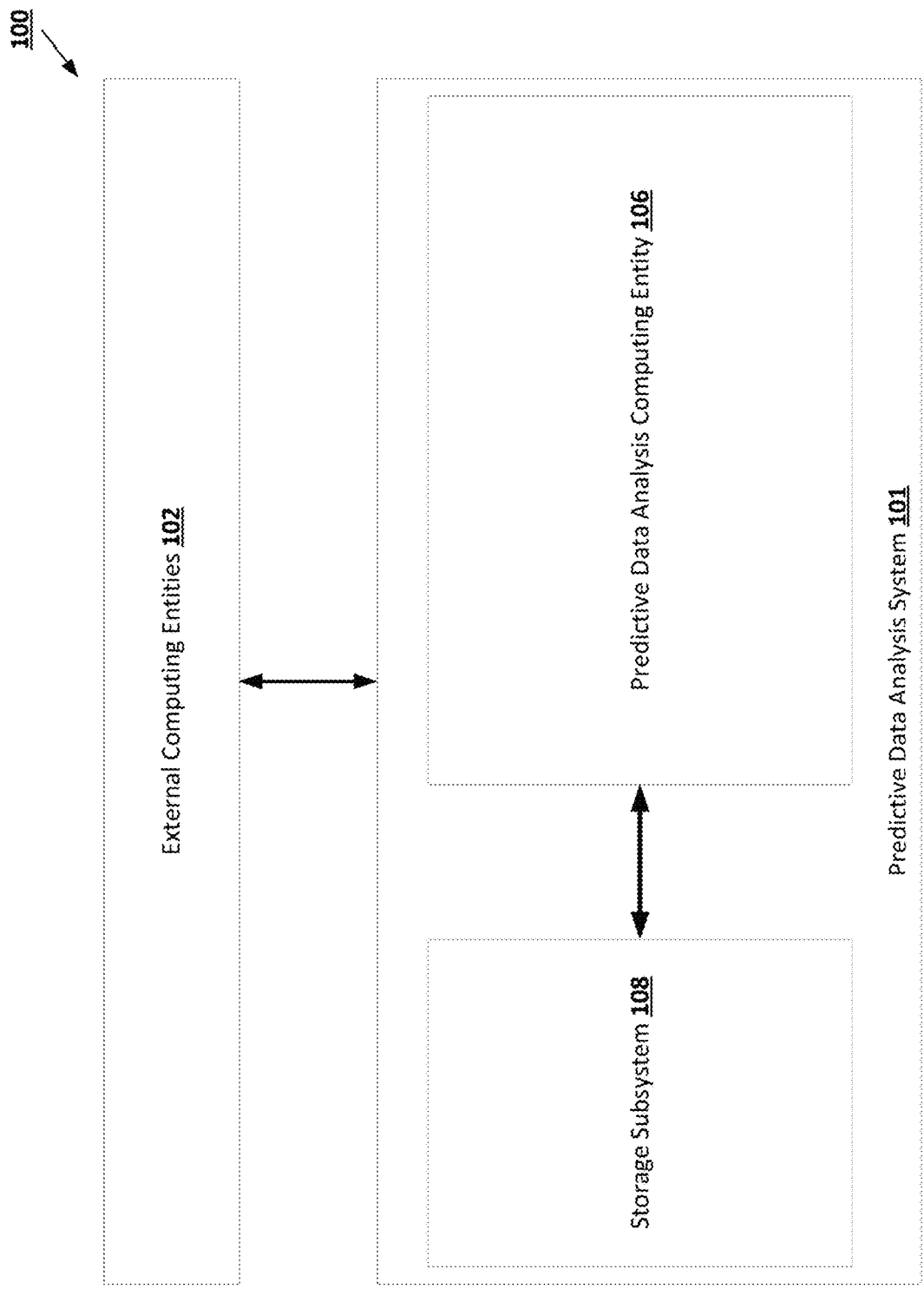

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
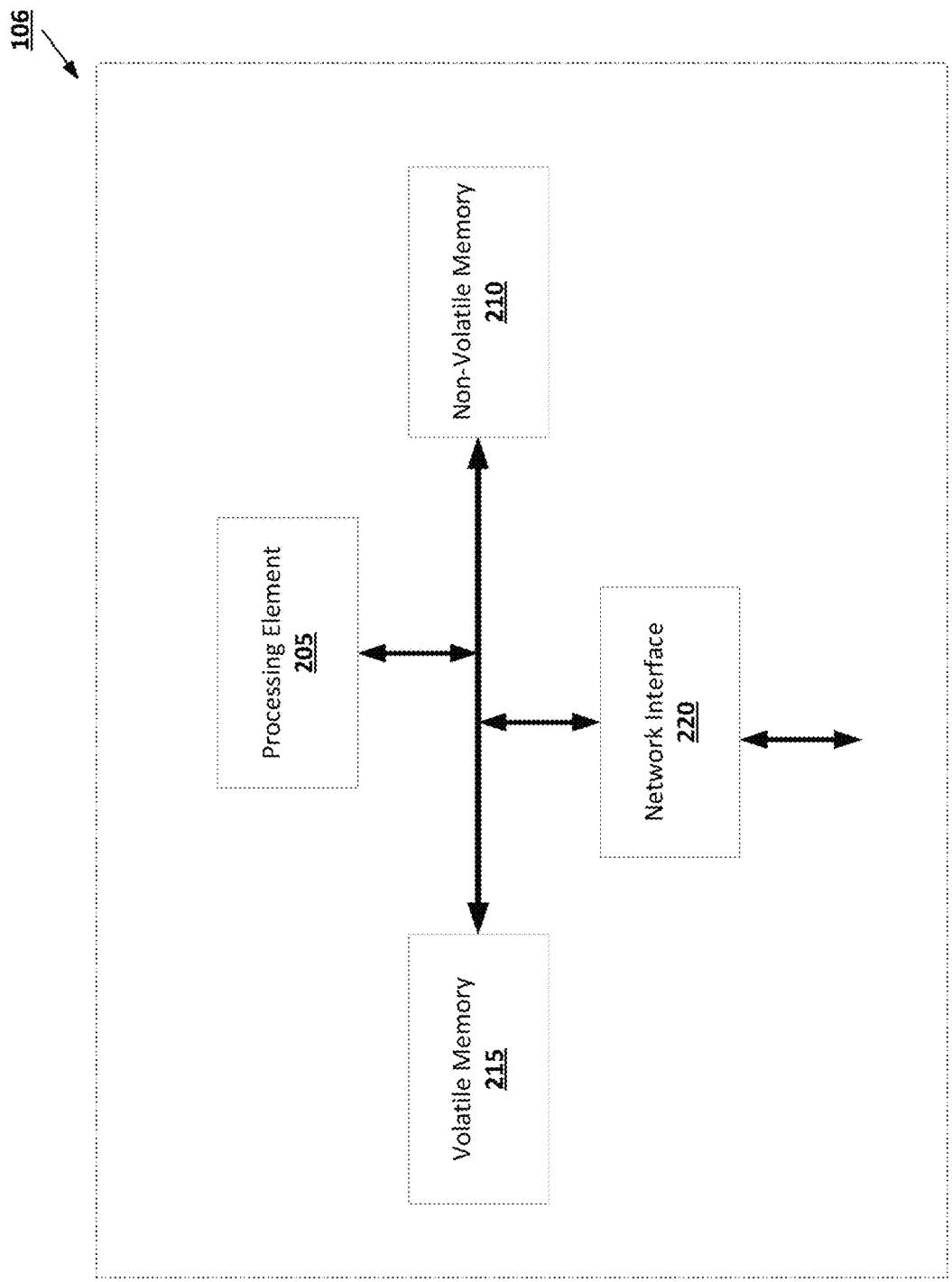

FIG. 2 provides an example predictive data analysis computing entity in accordance with some embodiments discussed herein.

Figure 3:
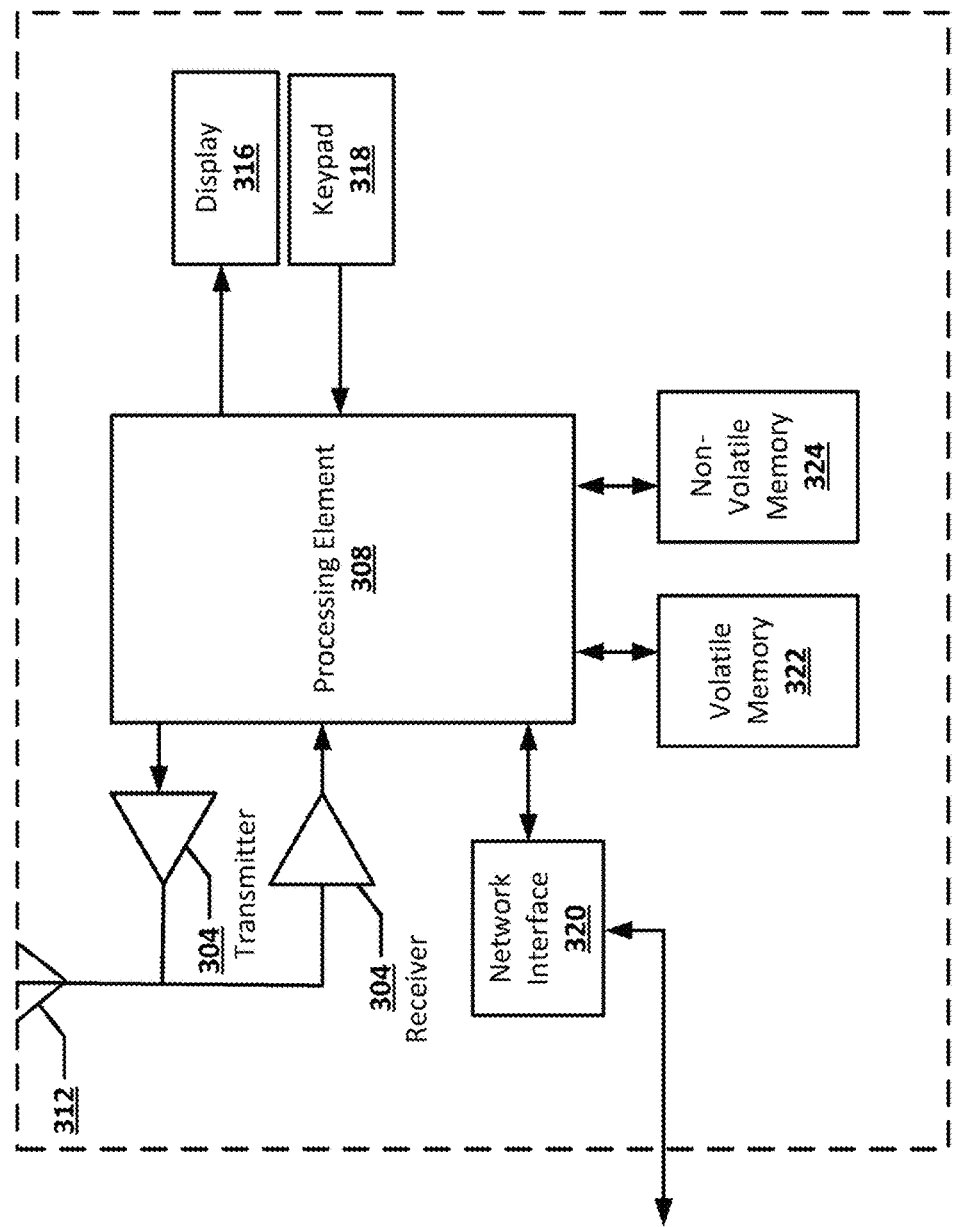

FIG. 3 provides an example external computing entity in accordance with some embodiments discussed herein.

Figure 4:
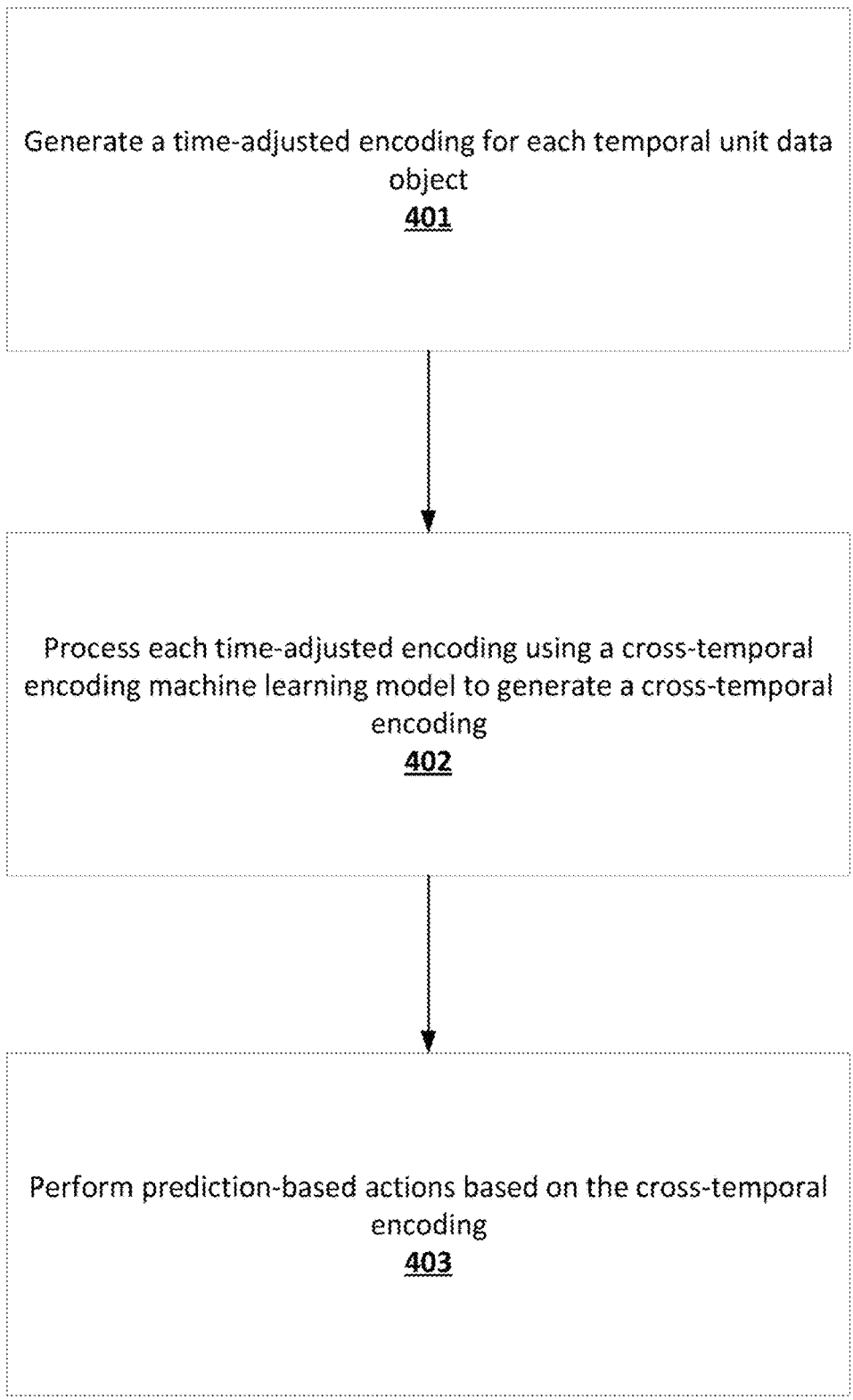

FIG. 4 is a flowchart diagram of an example process for performing cross-temporal predictive data analysis for a prediction input set in relation to a plurality of event types in accordance with some embodiments discussed herein.

Figure 5:
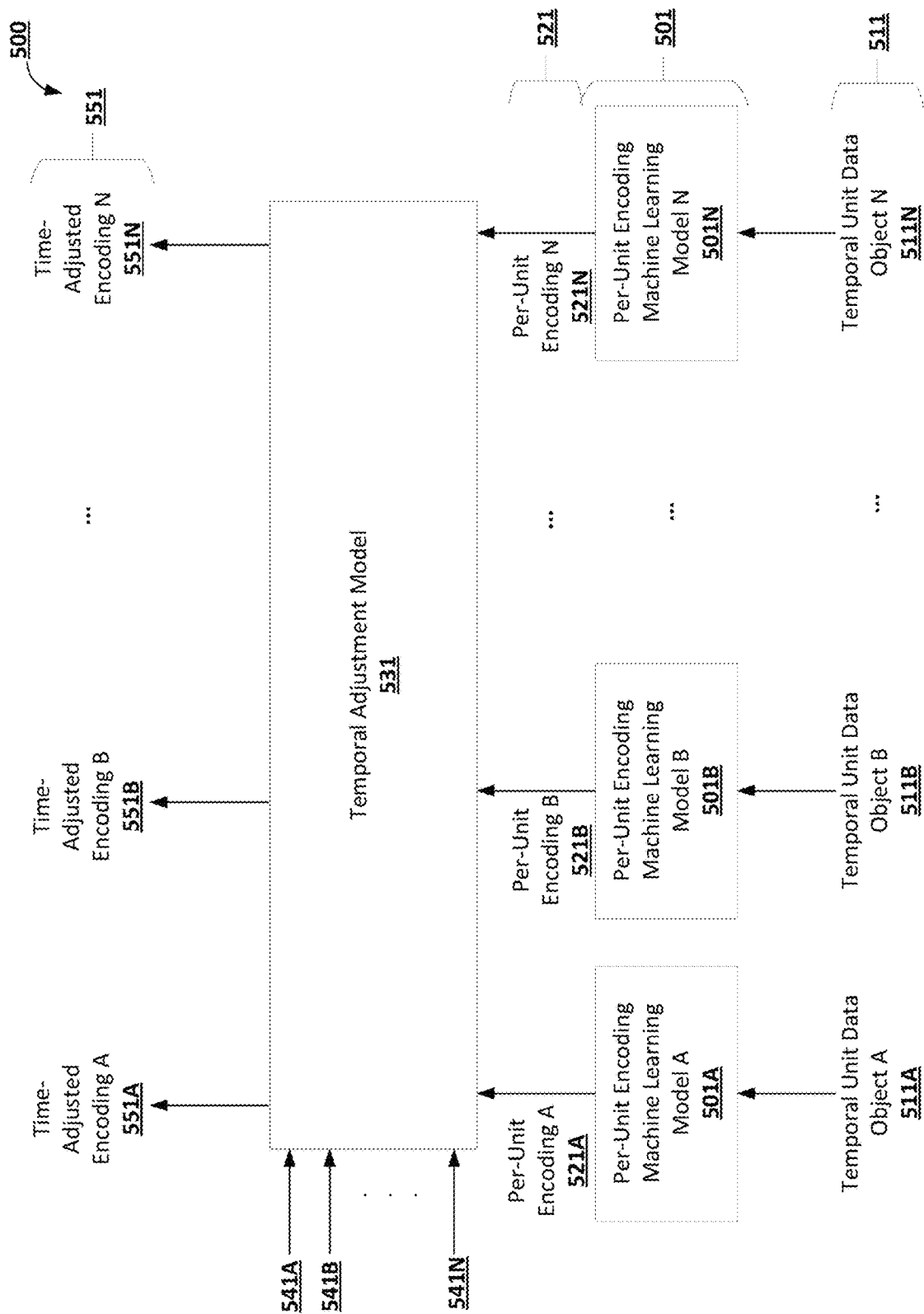

FIG. 5 is a data flow diagram of an example process for generating time-adjusted encodings for a group of temporal unit data objects in accordance with some embodiments discussed herein.

Figure 6:
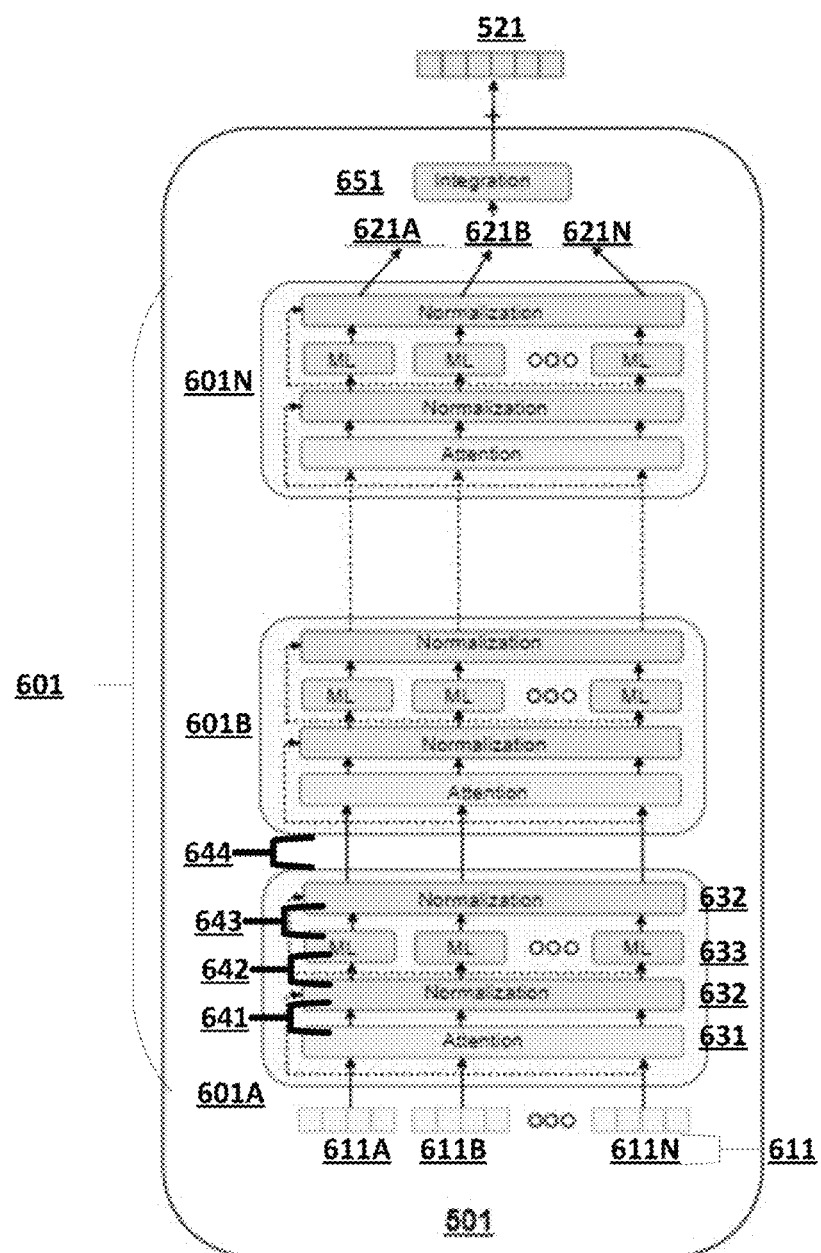

FIG. 6 is a data flow diagram of an example process for generating a per-unit encoding for a particular temporal unit data object in accordance with some embodiments discussed herein.

Figure 7:
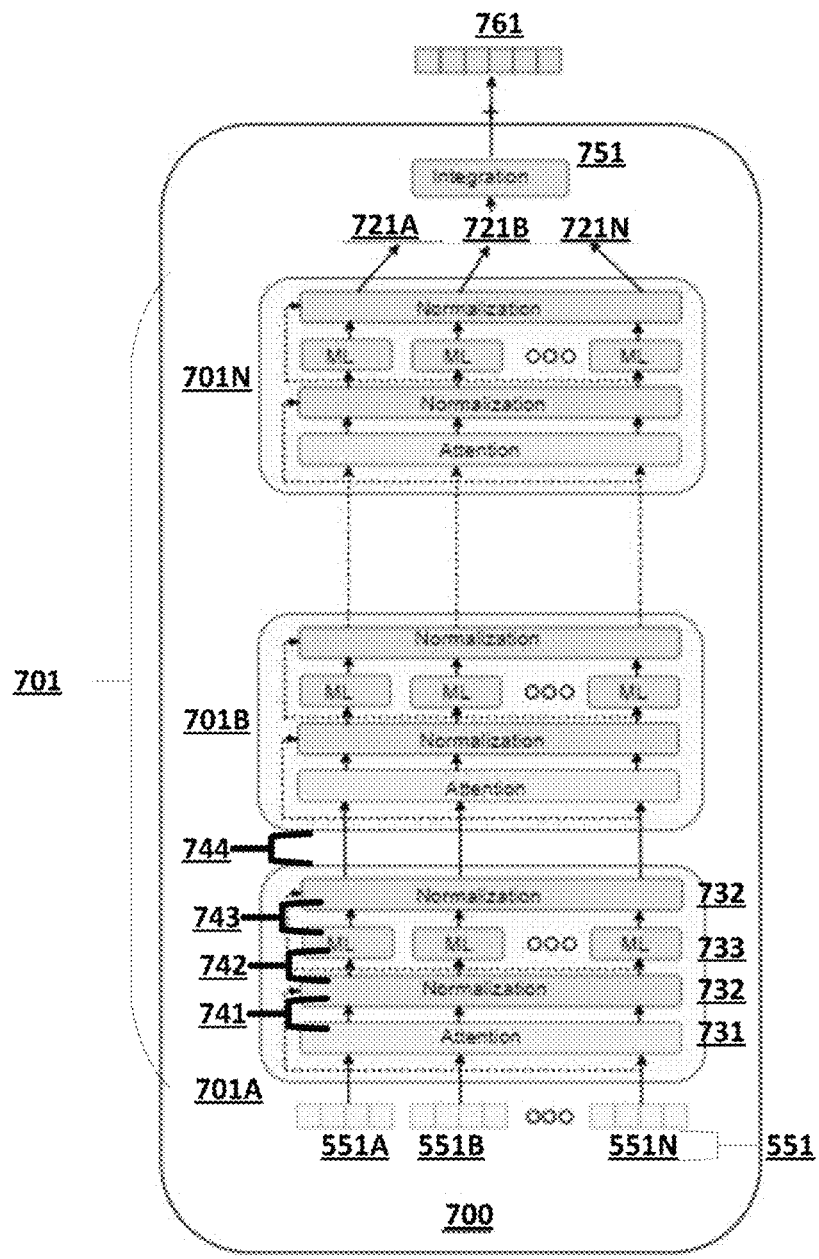

FIG. 7 is a data flow diagram of an example process for generating a cross-temporal encoding for a group of temporal unit data objects in accordance with some embodiments discussed herein.

FIG. 8 provides an operational example of a predictive output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative"

and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical challenges related to performing complex cross-temporal predictive data analysis tasks. Existing machine learning models, including various recurrent neural network (RNN) models such as long short term memory (LSTM) models, integrate temporal awareness into those models through sequential analysis. However, real-world temporal relationships between events and objects are often more complex than the cross-temporal relationships captured by sequential patterns. For example, a sequential encoding will encode the cross-temporal relationship between two pairs of successive events in a sequence of events in a similar manner regardless of whether the time delay between the first pair of successive events is a few minutes or the time delay between the second pair of successive events is many hours or days. Indeed, a careful observation will demonstrate that the notion of sequence, while useful for encoding temporality in real-time analysis tasks such as natural language processing, is inadequate to describe most real-world cross-temporal relationships between events that have a non-trivial delay between each other.

Due to the inability of many existing cross-temporal predictive data analysis models to integrate complex temporal relationships beyond sequential arrangement of events, many of those models are incapable of effectively analyzing various predictive data analysis tasks that involve complex temporal patterns. As a result, the noted existing cross-temporal predictive data analysis models are less efficient to train in order to perform temporally complex predictive data analysis tasks and less reliable when trained to effectively and accurately make predictive inferences related to such temporally complex predictive data analysis tasks. Accordingly, efficiently and reliably performing temporally complex predictive data analysis tasks is a major technical challenge of machine learning and artificial intelligence.

Various embodiments of the present invention address the technical challenges related to efficiently and effectively performing cross-temporal predictive data analysis by generating time-adjusted encoding representations of temporal unit data objects that integrate a measure of temporal position of those temporal unit data objects within a target temporal interval. By generating such time-adjusting encoding representations and using those time-adjusted encoding representations to generate cross-temporal representations, various embodiments of the present invention enable efficient and reliable ways for integrating complex temporal patterns into cross-temporal encoding by using temporal position measures that capture complex temporal patterns beyond mere sequential occurrence of events. As a result, the noted embodiments of the present invention enable cross-temporal predictive data analysis models that are more efficient to train in order to perform temporally complex predictive data analysis tasks and more reliable when trained in order to perform the noted temporally complex predictive data analysis tasks. In doing so, various embodiments of the present invention make important technical contributions to the fields machine learning and artificial intelligence by addressing technical challenges related to performing cross-temporal predictive data analysis in temporally complex domains as well as by substantially improving the training efficiency as well as operational reliability of cross-temporal predictive data analysis with respect to various temporally complex predictive data analysis tasks.

Additionally, various embodiments of the present invention introduce encoder machine learning architectures (e.g., the encoder machine learning architecture described below with reference to FIGS. 5-7) that are configured to handle irregularity of intervals in medical encounters (or other recorded events) as well as the irregularity of quantity of activities that could occur within an encounter, while keeping the quantity of learned parameters at a minimum by only using a limited number of (e.g., two) transformer encoders and learning the context-aware representations of medical encounters as opposed to context-free representations. The proposed solutions: (i) improve storage efficiency of cross-temporal predictive data analysis models by reducing the number of recorded parameters of those models, (ii) improve training efficiency of cross-temporal predictive data analysis models by reducing the number of parameters of those models that need to be determined during training processes, (iii) improve inference efficiency of cross-temporal predictive data analysis models by reducing the number of required operations of those models as well as by reducing or eliminating the need for utilizing computationally expensive RNNs in order to perform cross-temporal predictive data analysis tasks.

Furthermore, feed forward networks used to perform cross-temporal predictive analysis are generally easier to parallelize across computational resources as opposed to traditional sequence modelling techniques such as RNN-based techniques. By maintaining feed forward style layers in various proposed architectures, various embodiments of the present invention reduce the computational resources needed for training machine learning models configured to integrate irregular sequence timeseries data in order to perform cross-temporal predictive data analysis. Moreover, by pretraining the intra-encounter encoder on a large corpus of medical data, various embodiments of the present invention further reduce the computational resources needed to adequately and reliably model a generic medical predictive task.

Exemplary innovative and technologically advantageous aspects of various embodiments of the present invention include: (i) using bi-directional self-attention for point-in-time representation alone or in conjunction with using bi-directional self-attention for cross-temporal representation; (ii) training a machine learning model that is configured to learn the interdependency of events assisted by a temporal encoding model; (iii) enabling application of the cross-temporal representations concept to longitudinal patient records for predictive tasks in the healthcare domain by exploiting various high cardinality healthcare coding systems; (iv) using self-attention frameworks while avoiding using excessively large/complex networks; (v) enabling more efficient training of cross-temporal encoding models by utilizing only two encoding models in some embodiments; (vi) enhancing parallelization of cross-temporal encoding machine learning models by eliminating/reducing the use of sequence-based models like RNNs in such models, as sequence-based models like RNNs hamper parallelization because of interdependencies between various sequence-based timesteps; (vii) enabling a time-based encoding scheme that learns the relative importance of various events/activities as well as how such events/activities are related to future events/activities; and (viii) enabling use of intra-event encoders that can be pretrained, thus circumnavigating data restrictions (e.g., reducing the need for large data corpuses) and speeding up training/testing of such intra-event encoders.

II. DEFINITIONS

The term "temporally-defined predictive input" may refer to a data object that describes a set of input items that are deemed pertinent to a cross-temporal predictive data analysis task, where the set of input items are associated with timestamps that fall within a temporal interval associated with the cross-temporal predictive data analysis task. For example, given a cross-temporal predictive data analysis task that seeks to determine whether there is a predicted gap in medical documentation coverage related to a particular medical diagnosis for a particular patient, the noted cross-temporal predictive data analysis task may be deemed related to a temporal interval that includes a predefined number of months prior to a diagnosis time of the particular medical diagnosis. In the noted example, the temporally-defined predictive input that is associated with the cross-temporal predictive data analysis task may include all medical encounter records (e.g., provider visitation records, medical procedure records, drug prescription/pick-up records, and/or the like) associated with the particular patient where the respective timestamps of the noted medical encounter records fall within the predefined number of months prior to the diagnosis time of the particular medical diagnosis. As another example, given a cross-temporal predictive data analysis task that seeks to determine whether there is a predicted deficiency in a particular manufacturing process of a particular product, the noted cross-temporal predictive data analysis task may be deemed related to a temporal interval that includes a predefined number of hours prior to a recorded end time of the particular manufacturing process. In the noted example, the temporally-defined predictive input that is associated with the cross-temporal predictive data analysis task may include all operational logs associated with the particular manufacturing process where the respective timestamps of the noted operational logs fall within the predefined number of hours prior to the recorded end time of the particular manufacturing process.

The term "temporal unit data object" may refer to a data object that describes a subset of a temporally-defined predictive input whose respective timestamp falls within a data unit of the temporally-defined predictive input. For example, given a temporally-defined predictive input that includes medical encounter records associated with a particular patient where the respective timestamps of the noted medical encounter records fall within the predefined number of months prior to the diagnosis time of the particular medical diagnosis, the temporal unit data objects defined by the temporally-defined predictive input may include individual medical records for individual encounters. As another example, given a temporally-defined predictive input that includes medical encounter records associated with a particular patient where the respective timestamps of the noted medical encounter records fall within the predefined number of months prior to the diagnosis time of the particular medical diagnosis, the temporal unit data objects defined by the temporally-defined predictive input may include medical records whose timestamps are associated with particular units of time (e.g., days, weeks, and/or the like). As yet another example, given a temporally-defined predictive input that includes operational logs associated with a particular manufacturing process where the respective timestamps of the noted operational logs fall within a predefined number of hours prior to a recorded end time of the particular manufacturing process, the temporal unit data objects defined by the temporally-defined predictive input may include individual collections of operational logs for individual manufacturing sub-processes of the particular manufacturing process as defined by a manufacturing process definition hierarchy. As a further example, given a temporally-defined predictive input that includes operational logs associated with a particular manufacturing process where the respective timestamps of the noted operational logs fall within a predefined number of hours prior to a recorded end time of the particular manufacturing process, the temporal unit data objects defined by the temporally-defined predictive input may include collections of operational logs whose timestamps are associated with particular units of time (e.g., minutes, hours, and/or the like).

The term "time-adjusted encoding" may refer to a data object that describes a temporal unit data object as well as a position of a timestamp of the temporal unit data object within a temporal interval defined by the temporally-defined predictive input comprising the temporal unit data object. For example, given a temporally-defined predictive input that includes a set of medical encounter records associated with a particular patient where the respective timestamps of the noted medical encounter records fall within the temporal interval of the temporally-defined predictive input, and further given temporal data objects that include per-medical-encounter records (e.g., collections of medical description codes for each medical encounter within the defined temporal interval), each medical encounter may be associated with a time-adjusted encoding that is determined based at least in part on the medical encounter record for the medical record and a temporal position of a timestamp of the medical record within the temporal interval of the set of medical records (e.g., three days after a temporal interval that includes two months prior to the diagnosis date of a particular medical diagnosis for the particular patient). As another example, given a temporally-defined predictive input that includes a set of operational logs associated with a particular manufacturing process where the respective timestamps of the noted operational logs fall within the temporal interval of the temporally-defined predictive input, and further given temporal data objects that include per-sub-process records (e.g., collections of medical description codes for each sub-process of the particular manufacturing process), each manufacturing sub-process may be associated with a time-adjusted encoding that is determined based at least in part on the operational logs associated with the manufacturing sub-process and a temporal position of a timestamp of the manufacturing sub-process within the temporal interval of the set of operational logs (e.g., thirty seconds after a temporal interval that includes two hours prior to a recorded end time of the particular manufacturing process).

The term "per-unit encoding" may refer to a data object that describes the output of processing a corresponding temporal unit data object using an encoding machine learning model. For example, given a temporal unit data object that includes the medical encounter record for a particular medical record, the per-unit encoding for the medical encounter record may be generated by processing medical description codes (e.g., medical diagnosis codes such as International Statistical Classification of Diseases and Related Health Problems (ICD) codes, procedure codes, drug codes, and/or the like) associated with the medical encounter record in order to generate a per-unit encoding that describes each medical description code associated with the medical encounter record. As another example, given a temporal unit data object that describes a set of operational logs associated with a manufacturing sub-process of a particular manufacturing process, the per-unit encoding for the manufacturing sub-process may be generated by processing the set of operational logs in order to generate a per-unit encoding that describes each operational log associated with the manufacturing sub-process.

The term "predictive input token" may refer to a data object that describes properties of a unit of data within a corresponding temporal unit data object, such as an embedding vector determined based at least in part on a unit of data within the corresponding temporal unit data object. For example, if a temporal unit data object includes medical description codes associated with a medical encounter record, the predictive input tokens associated with the noted temporal unit data object may include embeddings of the noted medical description codes (e.g., embeddings of the noted medical description codes within a dimensionality-reduced embedding space). As another example, if a temporal object includes operational description codes associated with operational logs of a manufacturing sub-process, the predictive input tokens associated with the noted temporal unit data object may include embeddings of the noted operational description codes (e.g., embeddings of the noted operational description codes within a dimensionality-reduced embedding space).

The term "temporal positioning measure" may refer to a data object describes position of a timestamp associated with a temporal unit data object within a temporal interval (e.g., a temporal interval including one or more continuous time periods and/or one or more disjoint time periods). The temporal positioning measure may, for example, be determined based at least in part on a number of time units (e.g., minutes, weeks, hours, days, and/or the like) from a beginning point of the temporal interval that corresponds to a timestamp of the temporal unit data object. In some embodiments, the temporal positioning measure is determined based at least in part on a periodic oscillation time encoding scheme, a one-hot-encoding-based time encoding scheme, and/or the like. In some embodiments, the temporal positioning measure is a vector of the same dimension as the common dimension of the per-unit encodings of the temporal data objects.

The term "cross-temporal encoding machine learning model" may refer to a data object that describes parameters and/or hyper-parameters of a trained machine learning model that is configured to process data associated with a group of temporal units in order to generate a unified representation of the group of temporal units. For example, a cross-temporal encoding machine learning model may be configured to process per-unit time-adjusted encodings of temporal unit data objects associated with a group of temporal units in order to generate a unified representation of all of the noted group of temporal units. While various embodiments of the present invention have described cross-temporal encoding machine learning models that have the same general software architecture as that of per-unit encoding machine learning models used to generate inputs of the noted cross-temporal encoding machine learning models, a person of ordinary skill in the relevant technology will recognize that a cross-temporal encoding machine learning model may have a different architecture relative to at least some of the per-unit encoding machine learning models used to generate inputs of the noted cross-temporal encoding machine learning model. Moreover, at least in some embodiments, per-unit encoding machine learning models are pretrained model that are utilized and/or retrained for particular predictive domains in accordance with transfer learning techniques, while cross-temporal encoding machine learning models are not pretrained in accordance with the noted transfer learning techniques.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD- ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing first-occurrence multi-event type predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a predictive data analysis task is generating medical documentation gap predictions based on patient medical encounter data across a group of patient medical encounters.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate the generated predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address the technical challenges related to efficiently and effectively performing cross-temporal predictive data analysis by generating time-adjusted encoding representations of temporal unit data objects that integrate a measure of temporal position of those temporal unit data objects within a target temporal interval. By generating such time-adjusting encoding representations and using those time-adjusted encoding representations to generate cross-temporal representations, various embodiments of the present invention enable efficient and reliable ways for integrating complex temporal patterns into cross-temporal encoding by using temporal position measures that capture complex temporal patterns beyond mere sequential occurrence of events. As a result, the noted embodiments of the present invention enable cross-temporal predictive data analysis models that are efficient to train in order to perform temporally complex predictive data analysis tasks and more reliable to perform the noted temporally complex predictive data analysis tasks when trained. In doing so, various embodiments of the present invention make important technical contributions to the fields machine learning and artificial intelligence by addressing technical challenges related to performing cross-temporal predictive data analysis in temporally complex domains as well as by substantially improving the training efficiency and reliability of cross-temporal predictive data analysis with respect to temporally complex predictive data analysis tasks.

FIG. 4 is a flowchart diagram of an example process 400 for performing cross-temporal predictive data analysis. Via the various steps/operations of the process 400, the predictive data analysis computing entity 106 can efficiently and effectively perform predictive data analysis on input data that has more complex temporal relationships compared to sequential data as well as on highly sparse input data, such as highly sparse categorical input data.

The process 400 begins at step/operation 401 when the predictive data analysis computing entity 106 generates a time-adjusted encoding for each temporal unit data object of a plurality of temporal unit data objects that are associated with a temporally-defined predictive input. In some embodiments, the predictive data analysis computing entity 106 first identifies the temporally-defined predictive input with respect to which the cross-temporal predictive data analysis is performed, subsequently retrieves the temporal unit data objects that are associated with the identified temporally-defined predictive input, and then generates a time-adjusted encoding for each retrieved temporal unit data object. Aspects of temporally-defined predictive inputs, temporal unit data objects, and time-adjusted encodings of temporal unit data objects are described below.

In some embodiments, to generate the time-adjusted encodings for temporal unit data objects, the predictive data analysis computing entity 106 processes the predictive input tokens associated with each temporal unit data object using a trained time-adjusted encoding machine learning model, where the trained time-adjusted encoding machine learning model may include a bidirectional self-attention encoder followed by a time encoding operation. However, while various embodiments of the present invention describe generating time-adjusted encodings of temporal unit data objects using bidirectional self-attention encoders, a person of ordinary skill in the relevant technology will recognize that other encoder networks (such as autoencoders, variational autoencoders, and/or the like) may also be utilized to generate per-unit encodings that are then time-adjusted in order to generate time-adjusted encodings.

In some embodiments, a temporally-defined predictive input describes a set of input items that are deemed pertinent to a cross-temporal predictive data analysis task, where the set of input items are associated with timestamps that fall within a temporal interval associated with the cross-temporal predictive data analysis task. For example, given a cross-temporal predictive data analysis task that seeks to determine whether there is a predicted gap in medical documentation coverage related to a particular medical diagnosis for a particular patient, the noted cross-temporal predictive data analysis task may be deemed related to a temporal interval that includes a predefined number of months prior to a diagnosis time of the particular medical diagnosis. In the noted example, the temporally-defined predictive input that is associated with the cross-temporal predictive data analysis task may include all medical encounter records (e.g., provider visitation records, medical procedure records, drug prescription/pick-up records, and/or the like) associated with the particular patient where the respective timestamps of the noted medical encounter records fall within the predefined number of months prior to the diagnosis time of the particular medical diagnosis. As another example, given a cross-temporal predictive data analysis task that seeks to determine whether there is a predicted deficiency in a particular manufacturing process of a particular product, the noted cross-temporal predictive data analysis task may be deemed related to a temporal interval that includes a predefined number of hours prior to a recorded end time of the particular manufacturing process. In the noted example, the temporally-defined predictive input that is associated with the cross-temporal predictive data analysis task may include all operational logs associated with the particular manufacturing process where the respective timestamps of the noted operational logs fall within the predefined number of hours prior to the recorded end time of the particular manufacturing process.

In some embodiments, a temporal unit data object describes a subset of a temporally-defined predictive input whose respective timestamp falls within a data unit of the temporally-defined predictive input. For example, given a temporally-defined predictive input that includes medical encounter records associated with a particular patient where the respective timestamps of the noted medical encounter records fall within the predefined number of months prior to the diagnosis time of the particular medical diagnosis, the temporal unit data objects defined by the temporally-defined predictive input may include individual medical records for individual encounters. As another example, given a temporally-defined predictive input that includes medical encounter records associated with a particular patient where the respective timestamps of the noted medical encounter records fall within the predefined number of months prior to the diagnosis time of the particular medical diagnosis, the temporal unit data objects defined by the temporally-defined predictive input may include medical records whose timestamps are associated with particular units of time (e.g., days, weeks, and/or the like). As yet another example, given a temporally-defined predictive input that includes operational logs associated with a particular manufacturing process where the respective timestamps of the noted operational logs fall within a predefined number of hours prior to a recorded end time of the particular manufacturing process, the temporal unit data objects defined by the temporally-defined predictive input may include individual collections of operational logs for individual manufacturing sub-processes of the particular manufacturing process as defined by a manufacturing process definition hierarchy. As a further example, given a temporally-defined predictive input that includes operational logs associated with a particular manufacturing process where the respective timestamps of the noted operational logs fall within a predefined number of hours prior to a recorded end time of the particular manufacturing process, the temporal unit data objects defined by the temporally-defined predictive input may include collections of operational logs whose timestamps are associated with particular units of time (e.g., minutes, hours, and/or the like).

In some embodiments, a time-adjusted encoding describes a temporal unit data object as well as a position of a timestamp of the temporal unit data object within a temporal interval defined by the temporally-defined predictive input comprising the temporal unit data object. For example, given a temporally-defined predictive input that includes a set of medical encounter records associated with a particular patient where the respective timestamps of the noted medical encounter records fall within the temporal interval of the temporally-defined predictive input, and further given temporal data objects that include per-medical-encounter records (e.g., collections of medical description codes for each medical encounter within the defined temporal interval), each medical encounter may be associated with a time-adjusted encoding that is determined based at least in part on the medical encounter record for the medical record and a temporal position of a timestamp of the medical record within the temporal interval of the set of medical records (e.g., three days after a temporal interval that includes two months prior to the diagnosis date of a particular medical diagnosis for the particular patient). As another example, given a temporally-defined predictive input that includes a set of operational logs associated with a particular manufacturing process whose respective timestamps fall within the temporal interval of the temporally-defined predictive input, and further given temporal data objects that include per-sub-process records (e.g., collections of medical description codes for each sub-process of the particular manufacturing process), each manufacturing sub-process may be associated with a time-adjusted encoding that is determined based at least in part on the operational logs associated with the manufacturing sub-process and a temporal position of a timestamp of the manufacturing sub-process within the temporal interval of the set of operational logs (e.g., thirty seconds after a temporal interval that includes two hours prior to a recorded end time of the particular manufacturing process).

In some embodiments, step/operation 401 may be performed in accordance with the process depicted in FIG. 5. The process depicted in FIG. 5 includes executing/performing operations of a collection of per-unit encoding machine learning models 501 each of which is associated with a temporal unit data object of a group of temporal unit data objects 511. For example, as depicted in FIG. 5, per-unit encoding machine learning model A 501A is associated with the temporal unit data object A 511A, per-unit encoding machine learning model B 501B is associated with the temporal unit data object B 511B, and per-unit encoding machine learning model N 501N is associated with the temporal unit data object N 511N.

As further depicted in FIG. 5, each per-unit encoding machine learning model 501 is configured to receive a corresponding temporal unit data object and process the corresponding temporal unit data object in order to generate a per-unit encoding of the temporal unit data object. For example, the per-unit encoding machine learning model A 501A is configured to receive the corresponding temporal unit data object A 511A and process the corresponding temporal unit data object A 511A in order to generate the per-unit encoding A 521A for the corresponding temporal unit data object A 511A. As another example, the per-unit encoding machine learning model B 501B is configured to receive the corresponding temporal unit data object B 511B and process the corresponding temporal unit data object B 511B in order to generate the per-unit encoding B 521B for the corresponding temporal unit data object B 511B. As a further example, the per-unit encoding machine learning model N 501N is configured to receive the corresponding temporal unit data object N 511N and process the corresponding temporal unit data object N 511N in order to generate the per-unit encoding N 521N for the corresponding temporal unit data object N 511N. Aspects of per-unit encodings are described in greater detail below.

In some embodiments, a per-unit encoding describes the output of processing a corresponding temporal unit data object using an encoding machine learning model. For example, given a temporal unit data object that includes the medical encounter record for a particular medical record, the per-unit encoding for the medical encounter record may be generated by processing medical description codes (e.g., medical diagnosis codes such as ICD codes, procedure codes, drug codes, and/or the like) associated with the medical encounter record in order to generate a per-unit encoding that describes each medical description code associated with the medical encounter record. As another example, given a temporal unit data object that describes a set of operational logs associated with a manufacturing sub-process of a particular manufacturing process, the per-unit encoding for the manufacturing sub-process may be generated by processing the set of operational logs in order to generate a per-unit encoding that describes each operational log associated with the manufacturing sub-process.

In some embodiments, steps/operations performed by a per-unit encoding machine learning model 501 with respect to a particular temporal unit data object may be described in accordance with the process depicted in FIG. 6. As depicted in FIG. 6, the per-unit encoding machine learning model 501 includes a predefined number (e.g., four, eight, and/or the like) of per-token encoding iterations 601, such as the per-token encoding iteration A 601A, the per-token encoding iteration B 601B, and the per-token encoding iteration M 601M. During each per-token encoding iteration 601, the per-unit encoding machine learning model 501 is configured to receive an input set and process the input set in order to generate an output set. The input set of the initial per-token encoding iteration of the predefined number of per-token encoding iterations 601 (i.e., the per-token encoding iteration A 601A) is a set of predictive input tokens 611 associated with the particular temporal unit data object. Furthermore, the input set of each non-initial per-token encoding iteration of the predefined number of per-token encoding iterations 601 (i.e., each per-token encoding iteration after the per-token encoding iteration A 601A) is the output set of the per-token encoding iteration that immediately precedes the non-initial per-token encoding iteration (e.g., the input set of the per-token encoding iteration B 601B is the output of the per-token encoding iteration A 601A). Moreover, the output set of an ultimate (i.e., final) per-token encoding iteration of the predefined number of per-token encoding iterations (i.e., the per-token encoding iteration N 601N) is a per-iteration per-token encoding for each predictive input token of the set of predictive input tokens (e.g., the per-iteration per-token encoding A 621A for the predictive input token 611A, the per-iteration per-token encoding B 621B for the predictive input token B 611B, and the per-iteration per-token encoding N 621N for the predictive input token N 611N).

In some embodiments, a predictive input token is a data object that describes properties of a unit of data within a corresponding temporal unit data object, such as an embedding vector determined based at least in part on a unit of data within the corresponding temporal unit data object. For example, if a temporal unit data object includes medical description codes associated with a medical encounter record, the predictive input tokens associated with the noted temporal unit data object may include embeddings of the noted medical description codes (e.g., embeddings of the noted medical description codes within a dimensionality-reduced embedding space). As another example, if a temporal object includes operational description codes associated with operational logs of a manufacturing sub-process, the predictive input tokens associated with the noted temporal unit data object may include embeddings of the noted operational description codes (e.g., embeddings of the noted operational description codes within a dimensionality-reduced embedding space).

In some embodiments, the predictive input tokens include embeddings of categorical input vectors for each medical encounter record. Examples of categorical values that may be included in the noted categorical input vectors include at least one of the following: ICD values, Current Procedural Terminology (CPT) values, Healthcare Common Procedure Coding System (HCPCS) values, National Drug Code (NDC) values, Hierarchical Ingredient Code List (HICL) values, Generic Product Identifier (GPI) values, Logical Observation Identifier Names and Codes (LOINC) values, and Systematized Nomenclature of Medicine (SNOMED) values. The embeddings of categorical input vectors may be performed using any embedding and/or any dimensionality reduction technique. In some embodiments, individual one-hot encoded representations of the high cardinality categorical variables are transformed into a low-dimensional learned continuous vector representation. The embedding models can be pretrained, fine-tuned (i.e., pre-initialized and trained), or fully trained at model training time.

FIG. 6 further depicts an example software architecture for a per-token encoding iteration of the predefined number of per-token encoding iterations 601. However, a person of ordinary skill in the relevant technology will recognize that a per-token encoding iteration may have other software architectures (e.g., may have layers in addition to the layers depicted in the exemplary embodiment of FIG. 6, may replace some of the layers depicted in the exemplary embodiment of FIG. 6 with other layers, and/or the like). Moreover, while the exemplary embodiment depicted in FIG. 6 depicts that all of the number of per-token encoding iterations 601 of the per-unit encoding machine learning model 501 as having the same overall software architecture, a person of ordinary skill in the relevant technology will recognize that different per-token encoding iterations of a per-unit encoding machine learning model may have different software architectures. The exemplary software architecture depicted in FIG. 6 with respect to a per-token encoding iteration of the predefined number of per-token encoding iterations 601 will now be described with reference to the per-token encoding iteration A 601A.

As depicted in FIG. 6, the per-token encoding iteration A 601A begins by processing the input set associated with the per-token encoding iteration A 601A (in this case the set of predictive input tokens 611, as the per-token encoding iteration A 601A is the initial per-token encoding iteration of the predefined number of per-token encoding iterations 601) using an attention-based machine learning model 631 in order to generate an attention set 641 that includes a separate an attention value subset for each predictive input token of the set of predictive input tokens 611.

In some embodiments, the attention-based machine learning model 631 is a multi-head self-attention layer that is configured to generate multiple learned contexts for each predictive input token and aggregate (e.g., concatenate) each of the multiple learned contexts to generate the attention set

641. In some embodiments, to generate the attention value subset for each predictive input token, the attention-based machine learning model 631 may calculate a contextual representation of each predictive input token based at least in part on other predictive input tokens within the set of predictive input tokens 611.

In some embodiments, to calculate the contextual representation of each predictive input token based at least in part on other predictive input tokens within the set of predictive input tokens 611, the attention-based machine learning model 631 may generate three representational vectors for each predictive input token: a query vector (Q), a key vector (K), and a value vector (V), where each of the noted representational vectors has a dimension d. Subsequent to generating the three noted d-dimensional representational vectors (i.e., vectors Q, K, and V) for a predictive input token, the attention-based machine learning model performs the operations described by the below equation to generate A, which is the attention value subset for the noted predictive input token:

$$A = softmax\left(\frac{Q\ K^T}{\sqrt{d_k}}\right)V \quad \text{Equation 1}$$

In some embodiments, the attention-based machine learning model 631 may enable bidirectional self-attention for point-in-time representation. In some embodiments, the attention-based machine learning model 631 performs attention by utilizing dot product attention. In some embodiments, the attention-based machine learning model 631 performs attention by utilizing additive attention with scaling. In some embodiments, the attention-based machine learning model 631 performs attention by utilizing additive attention without scaling.

As further depicted in FIG. 6, subsequent to generating the attention set 641, the per-token encoding iteration A 601A processes the attention set 641 and the set of predictive input tokens 611 using a normalization model 632 in order to generate a normalized attention set 642 that includes a normalized attention value for each predictive input token of the set of predictive input tokens 611. In some embodiments, to generate the normalized attention set 642, the normalization model sums up the attention set 641 and the set of predictive input tokens 611 to get a resultant vector and then performs a vector-wide normalization operation (e.g., a softmax normalization operation) across the resultant vector in order to generate the normalized attention set 642.

As further depicted in FIG. 6, subsequent to generating the normalized attention set 642, the per-token encoding iteration A 601A separately provides each portion of the normalized attention set 642 that corresponds to a particular predictive input token of the set of predictive input tokens 611 to a machine learning model 633 (e.g., a feed-forward neural network model) in order to generate a preliminary per-iteration per-token encoding 643 for the predictive input token. For example, the portion of the normalized attention set 642 that corresponds to the predictive input token A 611A may be separately supplied to a machine learning model in order to generate a preliminary per-iteration per-token encoding 643 for the predictive input token A 611A. As another example, the portion of the normalized attention set 642 that corresponds to the predictive input token B 611B may be separately supplied to the noted machine learning model in order to generate a preliminary per-iteration per-token encoding 643 for the predictive input token B 611B.

As yet another example, the portion of the normalized attention set 642 that corresponds to the predictive input token N 611N may be separately supplied to the machine learning model in order to generate a preliminary per-iteration per-token encoding 643 for the predictive input token N 611N. Examples of the machine learning models 633 include feed-forward neural networks that utilize one or more non-linear activation functions such as rectified linear unit functions, parametric rectified linear unit functions, sigmoid functions, hyperbolic tangent functions, Gaussian error linear unit functions, and/or the like. In some embodiments, the machine learning model 633 may not utilize any non-linear activation functions at all.

As further depicted in FIG. 6, subsequent to generating each preliminary per-iteration per-token encoding 643, the per-token encoding iteration A 601A processes the set containing each preliminary per-iteration per-token encoding 643 and the normalized attention set 642 using the normalization model 632 in order to generate the output set 644 for the per-token encoding iteration A 601A. The normalization model 632 may sum the set containing each preliminary per-iteration per-token encoding 643 and the normalized attention set 642 to generate a resultant set and subsequently perform a set-wide normalization across the resultant set in order to generate the output set 644 for the per-token encoding iteration A 601A. Given that the per-token encoding iteration A 601A is not an ultimate per-token encoding iteration, the per-token encoding iteration A 601A provides the output set to a subsequent iteration of the predefined number of per-token encoding iterations 601. Importantly, the output set includes a subset for each predictive input token of the set of predictive input tokens 611, which in turn enables the subsequent iteration to treat the output set on a per-token level and perform per-token operations similar to the operations described above in relation to the per-token encoding iteration A 601A.

While the exemplary embodiment depicted in FIG. 6 describes two executions of the normalization model 632 within each iteration, a person of ordinary skill in the relevant technology will recognize that the normalization model 632 may be used any number of times or may not be used at all. In some embodiments, at least one of the executions of the normalization model 632 may include executing normalization operations but not addition operations. In some embodiments, at least one of the executions of the normalization model 632 may include executing operations of a batch normalization layer.

As further depicted in FIG. 6, after performing the predefined number of per-token encoding iterations 601, a cross-token integration machine learning model 651 is configured to process the output set of the ultimate iteration of the predefined number of per-token encoding iterations 601 in order to generate the per-unit encoding A 521A for the corresponding temporal unit data object A 511A. The cross-token integration machine learning model 651 may be a feed-forward neural network machine learning model. In some embodiments, the per-unit encoding thus has same length across all temporal unit data objects in order to facilitate subsequent operations. Accordingly, in some embodiments, one function of the cross-token integration machine learning model 651 is to generate a fixed-size representation across all temporal unit data objects, where the noted temporal unit data objects may have a variable size and/or a variable number of predictive input tokens.

Examples of the cross-token integration machine learning models 651 include feed-forward neural networks that utilize one or more non-linear activation functions such as rectified linear unit functions, parametric rectified linear unit functions, sigmoid functions, hyperbolic tangent functions, Gaussian error linear unit functions, and/or the like. In some embodiments, the cross-token integration machine learning model 651 may not utilize any non-linear activation functions at all. In some embodiments, prior to performing the operations of the cross-token integration machine learning model 651, the output set of the ultimate per-token encoding iteration is generated by combining (e.g., arithmetic vector operations such as concatenating, summing, averaging, and/or the like) each preliminary per-iteration per-token encoding 643 for a predictive input token.

Returning to FIG. 5, the depicted process includes executing/performing operations of a temporal adjustment model 531 that is configured to process each per-unit encoding for a temporal unit data object of the group of temporal unit data objects 511 along with a temporal positioning measure of the temporal unit data object within the temporal interval of the temporally-defined predictive input in order to generate a time-adjusted encoding of the temporal unit data object.

For example, the temporal adjustment model 531 is configured to process the per-unit encoding A 521A along with a temporal positioning measure A 541A of the temporal unit data object A 511A in order to generate a time-adjusted encoding A 551A of the temporal unit data object A 511A. As another example, the temporal adjustment model 531 is configured to process the per-unit encoding B 521B along with a temporal positioning measure B 541B of the temporal unit data object A 511A in order to generate a time-adjusted encoding B 551B of the temporal unit data object B 511B. As yet another example, the temporal adjustment model 531 is configured to process the per-unit encoding N 521N along with a temporal positioning measure N 541N of the temporal unit data object N 511N in order to generate a time-adjusted encoding N 551N of the temporal unit data object N 511N. Aspects of temporal positioning measures as well as aspects of exemplary operations of temporal adjustment models are described below.

In some embodiments, a temporal positioning measure describes position of a timestamp associated with a temporal unit data object within a temporal interval (e.g., a temporal interval including one or more continuous time periods and/or one or more disjoint time periods). The temporal positioning measure may, for example, be determined based at least in part on a number of time units (e.g., minutes, weeks, hours, days, and/or the like) from a beginning point of the temporal interval that corresponds to a timestamp of the temporal unit data object. In some embodiments, the temporal positioning measure is determined based at least in part on a periodic oscillation time encoding scheme, a one-hot-encoding-based time encoding scheme, bit-encoding-based time encoding scheme, and/or the like. In some embodiments, the temporal positioning measure is a vector of the same dimension as the common dimension of the per-unit encodings of the temporal data objects. Example techniques for generating suitable time encodings as described and utilized herein are discussed in Vyk et al., *Encoding Cyclical Features for Deep Learning*, available at https://www.avanwyk.com/encoding-cyclical-features-for-deep-learning/. In some embodiments, performing time encoding on per-unit encodings in order to generate time-adjusted encodings can be performed in accordance with one or more time encoding parameters, where the time encoding parameters can be fixed or learned at training time.

To generate a time-adjusted encoding for a temporal unit data object, the temporal adjustment model 531 may combine the per-unit encoding for the temporal unit data object and the temporal deviation measure for the temporal unit data object. For example, in some embodiments, the temporal adjustment model 531 may add the per-unit encoding for a temporal unit data object and the temporal deviation measure for the temporal unit data object in order to generate the time-adjusted encoding for the temporal unit data object. As another example, in some embodiments, the temporal adjustment model 531 may perform a binary operation on the per-unit encoding for a temporal unit data object and the temporal deviation measure for the temporal unit data object in order to generate the time-adjusted encoding for the temporal unit data object. As yet another example, in some embodiments, the temporal adjustment model 531 may concatenate the per-unit encoding for a temporal unit data object and the temporal deviation measure for the temporal unit data object in order to generate the time-adjusted encoding for the temporal unit data object.

Returning to FIG. 4, at step/operation 402, the predictive data analysis computing entity 106 processes each time-adjusted encoding for a temporal unit data object of the plurality of temporal unit data objects using a cross-temporal encoding machine learning model in order to generate a cross-temporal encoding of the temporal interval of the temporally-defined predictive input. In some embodiments, the predictive data analysis computing entity 106 aggregates the time-adjusted encodings for temporal unit data objects to generate a representation of all of the temporal unit data objects that is configured to not only describe individual contents of those temporal unit data objects as well as content-wide relationships between those temporal unit data objects, but also complex temporal relationships between timestamps of the temporal unit data objects that go beyond sequential occurrence of those timestamps. Aspects of cross-temporal encoding machine learning models are described below.

In some embodiments, a cross-temporal encoding machine learning model is a machine learning model that is configured to process data associated with a group of temporal units in order to generate a unified representation of the group of temporal units. For example, a cross-temporal encoding machine learning model may be configured to process per-unit time-adjusted encodings of temporal unit data objects associated with a group of temporal units in order to generate a unified representation of all of the noted group of temporal units.

In some embodiments, to generate the cross-temporal encoding, the predictive data analysis computing entity 106 processes the time-adjusted encodings using a trained cross-temporal encoding machine learning model, where the trained cross-temporal encoding machine learning model may include a bidirectional self-attention encoder followed by a time encoding operation. However, while various embodiments of the present invention describe generating cross-temporal encodings using bidirectional self-attention encoders, a person of ordinary skill in the relevant technology will recognize that other encoder networks (such as autoencoders, variational autoencoders, and/or the like) may also be utilized to generate cross-temporal encodings.

While various embodiments of the present invention have described cross-temporal encoding machine learning models that have the same general software architecture as that of per-unit encoding machine learning models used to generate inputs of the noted cross-temporal encoding machine learning models, a person of ordinary skill in the relevant technology will recognize that a cross-temporal encoding machine learning model may have a different architecture relative to at least some of the per-unit encoding machine learning models used to generate inputs of the noted cross-temporal encoding machine learning model. Moreover, at least in some embodiments, per-unit encoding machine learning models are pretrained model that are utilized and/or retrained for particular predictive domains in accordance with transfer learning techniques, while cross-temporal encoding machine learning models are not pretrained in accordance with transfer learning techniques.

In some embodiments, step/operation 402 may be performed in accordance with the process depicted in FIG. 7. As depicted in FIG. 7, the cross-temporal encoding machine learning model 700 includes a predefined number (e.g., four, eight, and/or the like) of per-unit encoding iterations 701, such as the per-unit encoding iteration A 701A, the per-unit encoding iteration B 701B, and the per-unit encoding iteration N 701N. During each per-unit encoding iteration 701, the cross-temporal encoding machine learning model 700 is configured to receive an input set and process the input set in order to generate an output set. The input set of the initial per-unit encoding iteration of the predefined number of per-unit encoding iterations 701 (i.e., the per-unit encoding iteration A 701A) is a set of time-adjusted encodings 551 for the plurality of temporal unit data objects. Furthermore, the input set of each non-initial per-unit encoding iteration of the predefined number of per-unit encoding iterations 701 (i.e., each per-unit encoding iteration after the per-unit encoding iteration A 701A) is the output set of the per-unit encoding iteration that immediately precedes the non-initial per-unit encoding iteration (e.g., the input set of the per-unit encoding iteration B 701B is the output of the per-unit encoding iteration A 701A). Moreover, the output set of an ultimate (i.e., final) per-unit encoding iteration of the predefined number of per-unit encoding iterations (i.e., the per-unit encoding iteration N 701N) is a per-iteration per-unit encoding for each predictive input token of the set of time-adjusted encodings 551 (e.g., the per-iteration per-unit encoding A 721A for the time-adjusted encoding A 551A, the per-iteration per-unit encoding A 721A for the time-adjusted encoding B 551B, and the per-iteration per-unit encoding N 721N for the time-adjusted encoding N 551N).

FIG. 7 further depicts an example software architecture for a per-unit encoding iteration of the predefined number of per-unit encoding iterations 701. However, a person of ordinary skill in the relevant technology will recognize that a per-unit encoding iteration may have other software architectures (e.g., may have layers in addition to the layers depicted in the exemplary embodiment of FIG. 7, may replace some of the layers depicted in the exemplary embodiment of FIG. 7 with other layers, and/or the like). Moreover, while the exemplary embodiment depicted in FIG. 7 depicts that all of the number of per-unit encoding iterations 701 of the cross-temporal encoding machine learning model 700 as having the same overall software architecture, a person of ordinary skill in the relevant technology will recognize that different per-unit encoding iterations of a cross-temporal encoding machine learning model may have different software architectures. The exemplary software architecture depicted in FIG. 7 with respect to a per-unit encoding iteration of the predefined number of per-unit encoding iterations 701 will now be described with reference to the per-unit encoding iteration A 701A.

As depicted in FIG. 7, the per-unit encoding iteration A 701A begins by processing the input set associated with the per-unit encoding iteration A 701A (in this case the set of time-adjusted encodings, as the per-unit encoding iteration A 701A is the initial per-unit encoding iteration of the predefined number of per-unit encoding iterations 701) using an attention-based machine learning model 731 in order to generate an attention set 741 that includes a separate an attention value subset for each predictive input token of the set of time-adjusted encodings 551. In some embodiments, the attention-based machine learning model 731 is a multi-head self-attention layer that is configured to generate multiple learned contexts for each time-adjusted encoding and aggregate (e.g., concatenate) each of the multiple learned contexts to generate the attention set 741.

In some embodiments, to generate the attention value subset for each time-adjusted encoding, the attention-based machine learning model 731 may calculate a contextual representation of each time-adjusted encoding based at least in part on other time-adjusted encodings within the set of time-adjusted encodings 551. In some embodiments, to calculate the contextual representation of each time-adjusted encoding based at least in part on other time-adjusted encodings within the set of time-adjusted encodings 551, the attention-based machine learning model may generate three representational vectors for each time-adjusted encoding: a query vector (Q), a key vector (K), and a value vector (V), where each of the noted representational vectors has a dimension d. Subsequent to generating the three noted d-dimensional representational vectors (i.e., vectors Q, K, and V) for an time-adjusted encoding, the attention-based machine learning model performs the operations described by Equation 1 in order to generate A, which may be the attention value subset for the noted time-adjusted encoding.

In some embodiments, the attention-based machine learning model 731 may enable bidirectional self-attention for point-in-time representation. In some embodiments, the attention-based machine learning model 731 performs attention by utilizing dot product attention. In some embodiments, the attention-based machine learning model 731 performs attention by utilizing additive attention with scaling. In some embodiments, the attention-based machine learning model 731 performs attention by utilizing additive attention without scaling.

As further depicted in FIG. 7, subsequent to generating the attention set 741, the per-unit encoding iteration A 701A processes the attention set 741 and the set of time-adjusted encodings 551 using a normalization model 732 in order to generate a normalized attention set 742 that includes a normalized attention value for each time-adjusted encoding of the set of time-adjusted encodings 551. In some embodiments, to generate the normalized attention set 742, the normalization model sums up the attention set 741 and the set of time-adjusted encodings 551 to get a resultant vector and then performs a vector-wide normalization operation (e.g., a softmax normalization operation) across the resultant vector in order to generate the normalized attention set 742.

As further depicted in FIG. 7, subsequent to generating the normalized attention set 742, the per-unit encoding iteration A 701A separately provides each portion of the normalized attention set 742 that corresponds to a particular time-adjusted encoding of the set of time-adjusted encodings 551 to a machine learning model 733 (e.g., a feed-forward neural network model) in order to generate a preliminary per-iteration per-unit encoding 743 for the time-adjusted encoding. For example, the portion of the normalized attention set 742 that corresponds to the time-adjusted encoding A 551A may be separately supplied to a machine learning model in order to generate a preliminary per-iteration per-unit encoding 743 for the time-adjusted encoding A 551A. As another example, the portion of the normalized attention set 742 that corresponds to the time-adjusted encoding B 551B may be separately supplied to the noted machine learning model in order to generate a preliminary per-iteration per-unit encoding 743 for the time-adjusted encoding B 551B. As yet another example, the portion of the normalized attention set 742 that corresponds to the time-adjusted encoding N 551N may be separately supplied to the machine learning model in order to generate a preliminary per-iteration per-unit encoding 743 for the time-adjusted encoding N 551N. Examples of the machine learning models 733 include feed-forward neural networks that utilize one or more non-linear activation functions such as rectified linear unit functions, parametric rectified linear unit functions, sigmoid functions, hyperbolic tangent functions, Gaussian error linear unit functions, and/or the like. In some embodiments, the machine learning model 733 may not utilize any non-linear activation functions at all.

As further depicted in FIG. 7, subsequent to generating each preliminary per-iteration per-unit encoding 743, the per-unit encoding iteration A 701A processes the set containing each preliminary per-iteration per-unit encoding 743 and the normalized attention set 742 using the normalization model 732 in order to generate the output set 744 for the per-unit encoding iteration A 701A. The normalization model 732 may sum the set containing each preliminary per-iteration per-unit encoding 743 and the normalized attention set 742 to generate a resultant set and subsequently perform a set-wide normalization across the resultant set in order to generate the output set 744 for the per-unit encoding iteration A 701A. Given that the per-unit encoding iteration A 701A is not an ultimate per-unit encoding iteration, the per-unit encoding iteration A 701A provides the output set to a subsequent iteration of the predefined number of per-unit encoding iterations 701. Importantly, the output set includes a subset for each time-adjusted encoding of the set of time-adjusted encodings 551, which in turn enables the subsequent iteration to treat the output set on a per-unit level and perform per-unit operations similar to the operations described above in relation to the per-unit encoding iteration A 701A.

As further depicted in FIG. 7, after performing the predefined number of per-unit encoding iterations 701, a cross-unit integration machine learning model 751 is configured to process the output set of the ultimate iteration of the predefined number of per-unit encoding iterations 701 in order to generate the cross-temporal encoding 761. The cross-unit integration machine learning model 751 may be a feed-forward neural network machine learning model. In some embodiments, the per-unit encoding thus has same length across all temporally-defined predictive inputs in order to facilitate subsequent operations. Accordingly, in some embodiments, one function of the cross-unit integration machine learning model 751 is to generate a fixed-size representation across all temporally-defined predictive inputs, where the noted temporally-defined predictive inputs may have a variable size and/or a variable number of time-adjusted encodings.

Examples of the cross-unit integration machine learning models 751 include feed-forward neural networks that utilize one or more non-linear activation functions such as rectified linear unit functions, parametric rectified linear unit functions, sigmoid functions, hyperbolic tangent functions, Gaussian error linear unit functions, and/or the like. In some embodiments, the cross-unit integration machine learning model 751 may not utilize any non-linear activation functions at all. In some embodiments, the cross-unit integration machine learning model 751 may not utilize any non-linear activation functions at all. In some embodiments, prior to performing the operations of the cross-unit integration machine learning model 751, the output set of the ultimate per-token encoding iteration is generated by combining (e.g., arithmetic vector operations such as concatenating, summing, averaging, and/or the like) each preliminary per-iteration per-unit encoding for a temporal unit data object.

While the exemplary embodiment depicted in FIG. 7 describes two executions of the normalization model 732 within each iteration, a person of ordinary skill in the relevant technology will recognize that the normalization model 732 may be used any number of times or may not be used at all. In some embodiments, at least one of the executions of the normalization model 732 may include executing normalization operations but not addition operations. In some embodiments, at least one of the executions of the normalization model 732 may include executing operations of a batch normalization layer.

In some embodiments, the cross-temporal encoding may be concatenated with static data (e.g. patient ethnicity, patient location, and/or the like) in the form of a concatenated vector of one-hot encoded variables for categorical information or float values for non-categorical variables. In some embodiments, when each temporal unit data object relates to a medical encounter, the cross-temporal encoding may be concatenated with temporal data not necessarily relevant to the medical encounter (e.g. patient age, encounter location, physician specialty, and/or the like) in the form of a concatenated vector of one-hot encoded variables for categorical information or float values for non-categorical variables.

Returning to FIG. 4, at step/operation 403, the predictive data analysis computing entity 106 performs one or more prediction-based actions based at least in part on the cross-temporal encoding. In some embodiments, the predictive data analysis computing entity 106 provides the cross-temporal encoding to a subsequent machine learning model (e.g., a classification model) that is configured to process the cross-temporal encoding to generate a prediction (e.g., a classification) about the temporally-defined predictive data inputs. In some embodiments, the predictive data analysis computing entity 106 may perform one or more prediction-based actions based at least in part on the noted predictions. Examples of the predictions generated based on cross-temporal encodings include medical documentation gap likelihood predictions, health insurance coverage gap predictions, patient health predictions, and/or the like.

In some embodiments, to perform the prediction-based actions, the predictive data analysis computing entity 106 may display a user interface based at least in part on the generated prediction. Other examples of prediction-based actions include automated physician notifications, automated patient notifications, automated medical appointment scheduling, automated drug prescription recommendation, automated drug prescription generation, automated implementation of precautionary actions, automated hospital preparation actions, automated insurance workforce management operational management actions, automated insurance server load balancing actions, automated call center preparation actions, automated hospital preparation actions, automated insurance plan pricing actions, automated insurance plan update actions, and/or the like.

In some embodiments, performing the one or more prediction-based actions comprises a set of operations as a result of which a feed-forward network is used to transform the cross-temporal encoding to a required shape for the task at hand; for example, if the task were multi-label classification, then an output of the same size of the total number of classes would be appropriate. For binary classification or regression tasks, the final feed forward network may have a single hidden unit which would also make the output a singular value. In general, in some embodiments, performing the one or more prediction-based actions includes utilizing an output linear layer, where the output linear layer can be altered to suit the task at hand.

In some embodiments, each temporal data object of the plurality of temporal data objects is associated with a medical encounter record of a plurality of medical encounter records, and each predictive input token of the one or more predictive input tokens for a temporal data object of the plurality of temporal data objects is a medical description code for the medical encounter record that is associated with the temporal data object. In some of the noted embodiments, processing the cross-temporal encoding using a coverage gap detection machine learning model in order to detect one or more coverage gap likelihood predictions for the temporal interval.

In some embodiments, the predictive data analysis computing entity 106 is configured to display a predictive out user interface that is configured to display the output of one or more predictive data analysis tasks performed using the cross-temporal encoding. An operational example of such a predictive output user interface 800 is depicted in FIG. 8, which is an example of a user interface that may be presented to a medical documentation gap agent user profile by a health insurance server.

As depicted in FIG. 8, the predictive output user interface 800 provides, for each medical claim a group of medical claims in a medical claims inventory, the predicted documentation gap likelihood prediction 810 for the medical claim that describes the likelihood that the medical claim has gaps in required medical documentation. As further depicted in FIG. 8, the predictive output user interface 800 provides, for each medical claim a group of medical claims in a medical claims inventory, the claim date 801 of the medical claim which describes an occurrence date of a medical service corresponding to the medical claim. As further depicted in FIG. 8, the predictive output user interface 800 provides, for each medical claim a group of medical claims in a medical claims inventory, the claim identifier 802 of the medical claim which uniquely identifies the medical claim. As further depicted in FIG. 8, the predictive output user interface 800 provides, for each medical claim a group of medical claims in a medical claims inventory, the region 803 of the medical claim which describes a geographic region of occurrence of a medical service corresponding to the medical claim. As further depicted in FIG. 8, the predictive output user interface 800 provides, for each medical claim a group of medical claims in a medical claims inventory, the primary ICD code 804 of the medical claim which describes the ICD code deemed most significant to a medical service corresponding to the medical claim. As further depicted in FIG. 8, the predictive output user interface 800 provides, for each medical claim a group of medical claims in a medical claims inventory the claim dollar amount 805 of the medical claim.

As further depicted in FIG. 8, the medical claims can be sorted based on ascending or descending severity of prediction medical documentation gap labels using the button 821. As further depicted in FIG. 8, placing the cursor on an entry causes display of an information related to the entry. For example, placing the cursor on a primary ICD code entry causes display of information describing the meaning of the primary ICD code and providing a link to additional information about the meaning of the primary ICD code.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method, comprising:
generating, by one or more processors and using a per-unit encoding machine learning model trained for a predictive domain associated with a temporal unit data object of a plurality of temporal unit data objects, a per-unit encoding of the temporal unit data object based at least in part on one or more predictive input tokens associated with the temporal unit data object, wherein generating the per-unit encoding of the temporal unit data object comprises generating a per-token encoding set based at least in part on an attention set generated using an attention-based machine learning model and a normalized attention set generated using a normalization model and at least the attention set;
generating, by the one or more processors, a time-adjusted encoding of the temporal unit data object based at least in part on the per-unit encoding of the temporal unit data object and a temporal positioning measure of the temporal unit data object within a temporal interval of a temporally-defined predictive input;
generating, by the one or more processors, based at least in part on the time-adjusted encoding for the temporal unit data object of the plurality of temporal unit data objects and using a cross-temporal encoding machine learning model, a cross-temporal encoding of the temporal interval; and
initiating, by the one or more processors, the performance of one or more prediction-based actions based at least in part on the cross-temporal encoding.

2. The computer-implemented method of claim 1, wherein generating the per-unit encoding of the temporal unit data object of the plurality of temporal unit data objects further comprises:
generating, based at least in part on performing a predefined number of per-token encoding iterations, the per-token encoding set comprising a per-token encoding for a predictive input token of the one or more predictive input tokens associated with the temporal unit data object, wherein: (i) a per-token encoding iteration of the predefined number of per-token encoding iterations is configured to generate, based at least in part on an input set for the per-token encoding iteration, an output set for the per-token encoding iteration, (ii) the input set for an initial per-token encoding iteration of the predefined number of per-token encoding iterations comprises a predictive input token of the one or more predictive input tokens associated with the temporal unit data object, (iii) the input set for a non-initial per-token encoding iteration of the predefined number of per-token encoding iterations is an output set of an immediately preceding per-token encoding iteration of the predefined number of per-token encoding iterations, and (iv) the output set for an ultimate per-token encoding iteration of the predefined number of per-token encoding iterations is the per-token encoding set; and generating, based at least in part on the per-token encoding set and using a cross-token encoding machine learning model, the per-unit encoding.

3. The computer-implemented method of claim 2, wherein performing the per-token encoding iteration of the predefined number of per-token encoding iterations comprises:

generating, based at least in part on the input set associated with the per-token encoding iteration, and using the attention-based machine learning model, the attention set associated with the per-token encoding iteration;

generating, based at least in part on the attention set and the predictive input token of the one or more predictive input tokens associated with the temporal unit data object, and using the normalization model, the normalized attention set associated with the per-token encoding iteration;

for the predictive input token of the one or more predictive input tokens associated with the temporal unit data object, generating, based at least in part on a related subset of the normalized attention set associated with the predictive input token, and using a per-iteration feed-forward neural network model, a per-iteration per-token encoding for the predictive input token; and generating, based at least in part on the per-iteration per-token encoding for the predictive input token of the one or more predictive input tokens, and using the normalization model, the output set for the per-token encoding iteration.

4. The computer-implemented method of claim 2, wherein the cross-token encoding machine learning model comprises a cross-token feed-forward neural network model.

5. The computer-implemented method of claim 1, wherein generating the cross-temporal encoding comprises:

generating, based at least in part on performing a predefined number of per-unit encoding iterations, a per-unit encoding set comprising a per-unit encoding for the temporal unit data object of the plurality of temporal data objects, wherein: (i) the per-unit encoding iteration of the predefined number of per-unit encoding iterations is configured to generate, based at least in part on an input set for the per-unit encoding iteration, an output set for the per-unit encoding iteration, (ii) the input set for an initial per-unit encoding iteration of the predefined number of per-unit encoding iterations comprises a time-adjusted encoding for a temporal unit data object of the plurality of temporal unit data objects, (iii) the input set for a non-initial per-unit encoding iteration of the predefined number of per-unit encoding iterations is an output set of an immediately preceding per-unit encoding iteration of the predefined number of per-unit encoding iterations, and (iv) the output set for an ultimate per-unit encoding iteration of the predefined number of per-unit encoding iterations is the per-unit encoding set; and generating, based at least in part on the per-unit encoding set, and using the cross-temporal encoding machine learning model, the cross-temporal encoding.

6. The computer-implemented method of claim 5, wherein performing the per-unit encoding iteration of the predefined number of per-unit encoding iterations comprises:

generating, based at least in part on the input set associated with the per-unit encoding iteration and using an attention-based machine learning model, an attention set associated with the per-unit encoding iteration;

generating, based at least in part on the attention set and the time-adjusted encoding for the temporal unit data object of the plurality of temporal unit data objects, and using a normalization model, a normalized attention set associated with the per-unit encoding iteration;

for the temporal unit data object of the plurality of temporal unit data objects, generating, based at least in part on a related subset of the normalized attention set that is associated with the temporal unit data object, and using a per-iteration feed-forward neural network model, a per-iteration per-unit encoding for the temporal unit data object; and generating, based at least in part on the per-iteration per-unit encoding for the temporal unit data object of the plurality of temporal unit data objects, and using the normalization model, the output set for the per-unit encoding iteration.

7. The computer-implemented method of claim 5, wherein the cross-temporal encoding machine learning model comprises a cross-temporal feed-forward neural network model.

8. The computer-implemented method of claim 1, wherein:

for the temporal unit data object of the plurality of temporal unit data objects, the per-unit encoding of the temporal unit data object and the temporal positioning measure of the temporal unit data object have a common dimensionality, and generating the time-adjusted encoding for a temporal unit data object of the plurality of temporal unit data objects comprises summing the per-unit encoding of the temporal unit data object and the temporal positioning measure of the temporal unit data object.

9. The computer-implemented method of claim 1, wherein generating the time-adjusted encoding for a temporal unit data object of the plurality of temporal unit data objects comprises:

generating the time-adjusted encoding for the temporal unit data object by concatenating the per-unit encoding of the temporal unit data object and the temporal positioning measure of the temporal unit data object.

10. The computer-implemented method of claim 1, wherein:

the temporal unit data object of the plurality of temporal unit data objects is associated with a medical encounter record of a plurality of medical encounter records, a predictive input token of the one or more predictive input tokens for the temporal unit data object of the plurality of temporal unit data objects is a medical description code for the medical encounter record that is associated with the temporal data object, and wherein the method further comprises:

detecting, based at least in part on the cross-temporal encoding, using a coverage gap detection machine learning model, one or more coverage gap likelihood predictions for the temporal interval.

11. An apparatus comprising one or more processors and at least one memory including program code, the at least one memory and the program code configured to, with the one or more processors, cause the apparatus to at least:

generate, using a per-unit encoding machine learning model trained for a predictive domain associated with a temporal unit data object of a plurality of temporal unit data objects, a per-unit encoding of the temporal unit data object based at least in part on one or more predictive input tokens associated with the temporal unit data object, wherein generating the per-unit encoding of the temporal unit data object comprises generating a per-token encoding set based at least in part on an attention set generated using an attention-based machine learning model and a normalized attention set generated using a normalization model and at least the attention set;

generate a time-adjusted encoding of the temporal unit data object based at least in part on the per-unit encoding of the temporal unit data object and a temporal positioning measure of the temporal unit data object within a temporal interval of a temporally-defined predictive input;

generate, based at least in part on the time-adjusted encoding for a temporal unit data object of the plurality of temporal unit data objects and using a cross-temporal encoding machine learning model, a cross-temporal encoding of the temporal interval; and initiate the performance of one or more prediction-based actions based at least in part on the cross-temporal encoding.

12. The apparatus of claim 11, wherein generating the per-unit encoding of the temporal unit data object of the plurality of temporal unit data objects further comprises:

generating, based at least in part on performing a predefined number of per-token encoding iterations, the per-token encoding set comprising a per-token encoding for a predictive input token of the one or more predictive input tokens associated with the temporal unit data object, wherein: (i) a per-token encoding iteration of the predefined number of per-token encoding iterations is configured to generate, based at least in part on an input set for the per-token encoding iteration, an output set for the per-token encoding iteration, (ii) the input set for an initial per-token encoding iteration of the predefined number of per-token encoding iterations comprises the predictive input token of the one or more predictive input tokens associated with the temporal unit data object, (iii) the input set for a non-initial per-token encoding iteration of the predefined number of per-token encoding iterations is an output set of an immediately preceding per-token encoding iteration of the predefined number of per-token encoding iterations, and (iv) the output set for an ultimate per-token encoding iteration of the predefined number of per-token encoding iterations is the per-token encoding set; and generating, based at least in part on the per-token encoding set and using a cross-token encoding machine learning model, the per-unit encoding.

13. The apparatus of claim 12, wherein performing the per-token encoding iteration of the predefined number of per-token encoding iterations comprises:

generating, based at least in part on the input set associated with the per-token encoding iteration, and using the attention-based machine learning model, the attention set associated with the per-token encoding iteration;

generating, based at least in part on the attention set and the predictive input token of the one or more predictive input tokens associated with the temporal unit data object, and using the normalization model, the normalized attention set associated with the per-token encoding iteration;

for the predictive input token of the one or more predictive input tokens associated with the temporal unit data object, generating, based at least in part on a related subset of the normalized attention set associated with the predictive input token, and using a per-iteration feed-forward neural network model, a per-iteration per-token encoding for the predictive input token; and generating, based at least in part on the per-iteration per-token encoding for the predictive input token of the one or more predictive input tokens, and using the normalization model, the output set for the per-token encoding iteration.

14. The apparatus of claim 11, wherein generating the cross-temporal encoding comprises:

generating, based at least in part on performing a predefined number of per-unit encoding iterations, a per-unit encoding set comprising a per-unit encoding for the temporal unit data object of the plurality of temporal data objects, wherein: (i) the per-unit encoding iteration of the predefined number of per-unit encoding iterations is configured to generate, based at least in part on an input set for the per-unit encoding iteration, an output set for the per-unit encoding iteration, (ii) the input set for an initial per-unit encoding iteration of the predefined number of per-unit encoding iterations comprises a time-adjusted encoding for a temporal unit data object of the plurality of temporal unit data objects, (iii) the input set for a non-initial per-unit encoding iteration of the predefined number of per-unit encoding iterations is an output set of an immediately preceding per-unit encoding iteration of the predefined number of per-unit encoding iterations, and (iv) the output set for an ultimate per-unit encoding iteration of the predefined number of per-unit encoding iterations is the per-unit encoding set; and generating, based at least in part on the per-unit encoding set, and using the cross-temporal encoding machine learning model, the cross-temporal encoding.

15. The apparatus of claim 14, wherein performing the per-unit encoding iteration of the predefined number of per-unit encoding iterations comprises:

generating, based at least in part on the input set associated with the per-unit encoding iteration and using an attention-based machine learning model, an attention set associated with the per-unit encoding iteration;

generating, based at least in part on the attention set and the time-adjusted encoding for the temporal unit data object of the plurality of temporal unit data objects, and using a normalization model, a normalized attention set associated with the per-unit encoding iteration;

for the temporal unit data object of the plurality of temporal unit data objects, generating, based at least in part on a related subset of the normalized attention set that is associated with the temporal unit data object, and using a per-iteration feed-forward neural network model, a per-iteration per-unit encoding for the temporal unit data object; and generating, based at least in part on the per-iteration per-unit encoding for the temporal unit data object of the plurality of temporal unit data objects, and using the normalization model, the output set for the per-unit encoding iteration.

16. At least one non-transitory computer-readable storage medium having computer-readable program code portions stored therein, the computer-readable program code portions configured to:

generate, using a per-unit encoding machine learning model trained for a predictive domain associated with a temporal unit data object of a plurality of temporal unit data objects, a per-unit encoding of the temporal unit data object based at least in part on one or more predictive input tokens associated with the temporal unit data object, wherein generating the per-unit encoding of the temporal unit data object comprises generating a per-token encoding set based at least in part on an attention set generated using an attention-based machine learning model and a normalized attention set generated using a normalization model and at least the attention set;

generate a time-adjusted encoding of the temporal unit data object based at least in part on the per-unit encoding of the temporal unit data object and a temporal positioning measure of the temporal unit data object within a temporal interval of a temporally-defined predictive input;

generate, based at least in part on the time-adjusted encoding for the temporal unit data object of the plurality of temporal unit data objects and using a cross-temporal encoding machine learning model, a cross-temporal encoding of the temporal interval; and initiate the performance of one or more prediction-based actions based at least in part on the cross-temporal encoding.

17. The at least one non-transitory computer-readable storage medium of claim 16, wherein generating the per-unit encoding of the temporal unit data object of the plurality of temporal unit data objects further comprises:

generating, based at least in part on performing a predefined number of per-token encoding iterations, the per-token encoding set comprising a per-token encoding for a predictive input token of the one or more predictive input tokens associated with the temporal unit data object, wherein: (i) a per-token encoding iteration of the predefined number of per-token encoding iterations is configured to generate, based at least in part on an input set for the per-token encoding iteration, an output set for the per-token encoding iteration, (ii) the input set for an initial per-token encoding iteration of the predefined number of per-token encoding iterations comprises the predictive input token of the one or more predictive input tokens associated with the temporal unit data object, (iii) the input set for a non-initial per-token encoding iteration of the predefined number of per-token encoding iterations is an output set of an immediately preceding per-token encoding iteration of the predefined number of per-token encoding iterations, and (iv) the output set for an ultimate per-token encoding iteration of the predefined number of per-token encoding iterations is the per-token encoding set; and generating, based at least in part on the per-token encoding set and using a cross-token encoding machine learning model, the per-unit encoding.

18. The at least one non-transitory computer-readable storage medium of claim 17, wherein performing the per-token encoding iteration of the predefined number of per-token encoding iterations comprises:

generating, based at least in part on the input set associated with the per-token encoding iteration, and using the attention-based machine learning model, the attention set associated with the per-token encoding iteration;

generating, based at least in part on the attention set and the predictive input token of the one or more predictive input tokens associated with the temporal unit data object, and using the normalization model, the normalized attention set associated with the per-token encoding iteration;

for the predictive input token of the one or more predictive input tokens associated with the temporal unit data object, generating, based at least in part on a related subset of the normalized attention set associated with the predictive input token, and using a per-iteration feed-forward neural network model, a per-iteration per-token encoding for the predictive input token; and generating, based at least in part on the per-iteration per-token encoding for the predictive input token of the one or more predictive input tokens, and using the normalization model, the output set for the per-token encoding iteration.

19. The at least one non-transitory computer-readable storage medium of claim 17, wherein generating the cross-temporal encoding comprises:

generating, based at least in part on performing a predefined number of per-unit encoding iterations, a per-unit encoding set comprising a per-unit encoding for the temporal unit data object of the plurality of temporal data objects, wherein: (i) the per-unit encoding iteration of the predefined number of per-unit encoding iterations is configured to generate, based at least in part on an input set for the per-unit encoding iteration, an output set for the per-unit encoding iteration, (ii) the input set for an initial per-unit encoding iteration of the predefined number of per-unit encoding iterations comprises a time-adjusted encoding for a temporal unit data object of the plurality of temporal unit data objects, (iii) the input set for a non-initial per-unit encoding iteration of the predefined number of per-unit encoding iterations is an output set of an immediately preceding per-unit encoding iteration of the predefined number of per-unit encoding iterations, and (iv) the output set for an ultimate per-unit encoding iteration of the predefined number of per-unit encoding iterations is the per-unit encoding set; and generating, based at least in part on the per-unit encoding set, and using the cross-temporal encoding machine learning model, the cross-temporal encoding.

20. The at least one non-transitory computer-readable storage medium of claim 19, wherein performing the per-unit encoding iteration of the predefined number of per-unit encoding iterations comprises:

generating, based at least in part on the input set associated with the per-unit encoding iteration and using an attention-based machine learning model, an attention set associated with the per-unit encoding iteration;

generating, based at least in part on the attention set and the time-adjusted encoding for the temporal unit data object of the plurality of temporal unit data objects, and using a normalization model, a normalized attention set associated with the per-unit encoding iteration;

for the temporal unit data object of the plurality of temporal unit data objects, generating, based at least in part on a related subset of the normalized attention set that is associated with the temporal unit data object, and using a per-iteration feed-forward neural network model, a per-iteration per-unit encoding for the temporal unit data object; and generating, based at least in part on the per-iteration per-unit encoding for the temporal unit data object of the plurality of temporal unit data objects, and using the normalization model, the output set for the per-unit encoding iteration.

* * * * *